April 15, 1947.   A. R. PEZZILLO   2,419,159
COMBINATION PUMP-MOTOR-HEATER
Filed Dec. 19, 1944   2 Sheets-Sheet 1
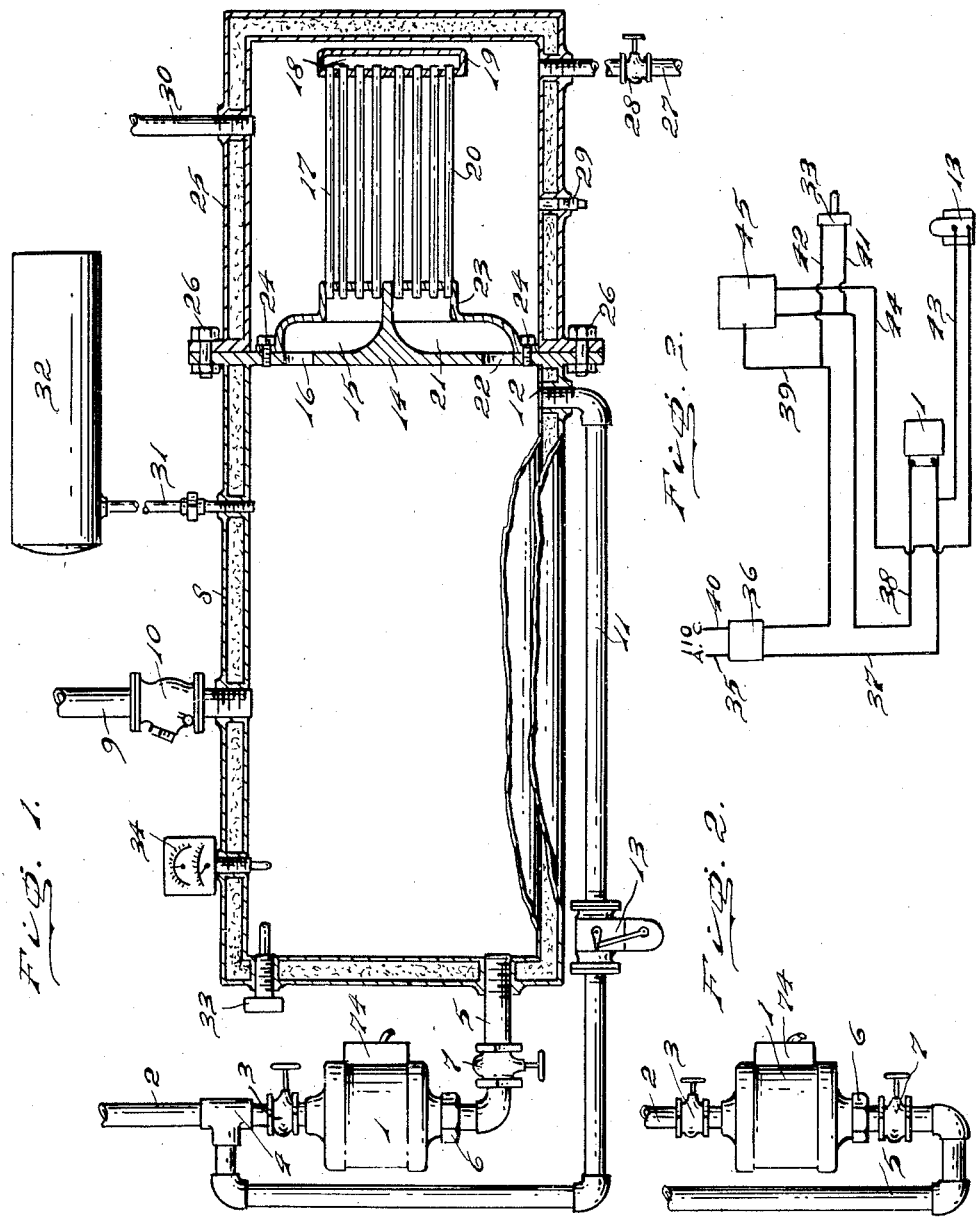
INVENTOR.
Albert R. Pezzillo
BY
Herbert P. Fairbanks
ATTORNEY.

INVENTOR.
Albert R Pezzillo
BY
Herbert S. Fairbanks
ATTORNEY.

Patented Apr. 15, 1947

2,419,159

UNITED STATES PATENT OFFICE 2,419,159

COMBINATION PUMP-MOTOR-HEATER

Albert R. Pezzillo, Philadelphia, Pa.

Application December 19, 1944, Serial No. 568,865

7 Claims. (Cl. 219—38)

The object of this invention is to devise a novel heat generating and circulating system which is of special advantage as a fluid heating plant.

As a result of numerous experiments over a considerable period of time, I have found that if an electrical unbalance is created between the stator and rotor of a combined motor and circulator that the induction of heat from the rotor by the fluid passing therethrough will effectively heat the fluid and at the same time circulate the heated fluid through the system.

This feature enables one to devise a very compact and economical heating system with the heat generator and circulator connected with the riser leading to the radiators or faucets and with the return line.

For greater heating capacity, I preferably employ a novel construction and arrangement of a tank or boiler adapted not only to maintain the required supply for the radiators but also to create the required supply for domestic hot water.

Suitable automatic controls are provided controlled by the temperature of the fluid in the tank and by room temperature to maintain a desired temperature of the fluid and its circulation.

With the foregoing and other objects in view as will hereinafter clearly appear, my invention comprehends a novel heat generator and circulating system.

It further comprehends a novel heat generator and circulator.

Other novel features of construction and advantage will appear in the detailed description.

For the purpose of illustrating the invention, I have shown in the accompanying drawings preferred embodiments thereof, which, in practice, will give satisfactory and reliable results. It is, however, to be understood that these embodiments are typical only and that the various instrumentalities of which the invention consists can be variously arranged and organized, and the invention is not limited to the exact arrangement and organization of these instrumentalities as herein set forth.

Figure 1 is a sectional elevation of a heat generator and circulator system, embodying my invention.

Figure 2 is a front elevation of another embodiment of the invention.

Figure 3 is a wiring diagram.

Similar numerals of reference indicate corresponding parts.

Figure 4:
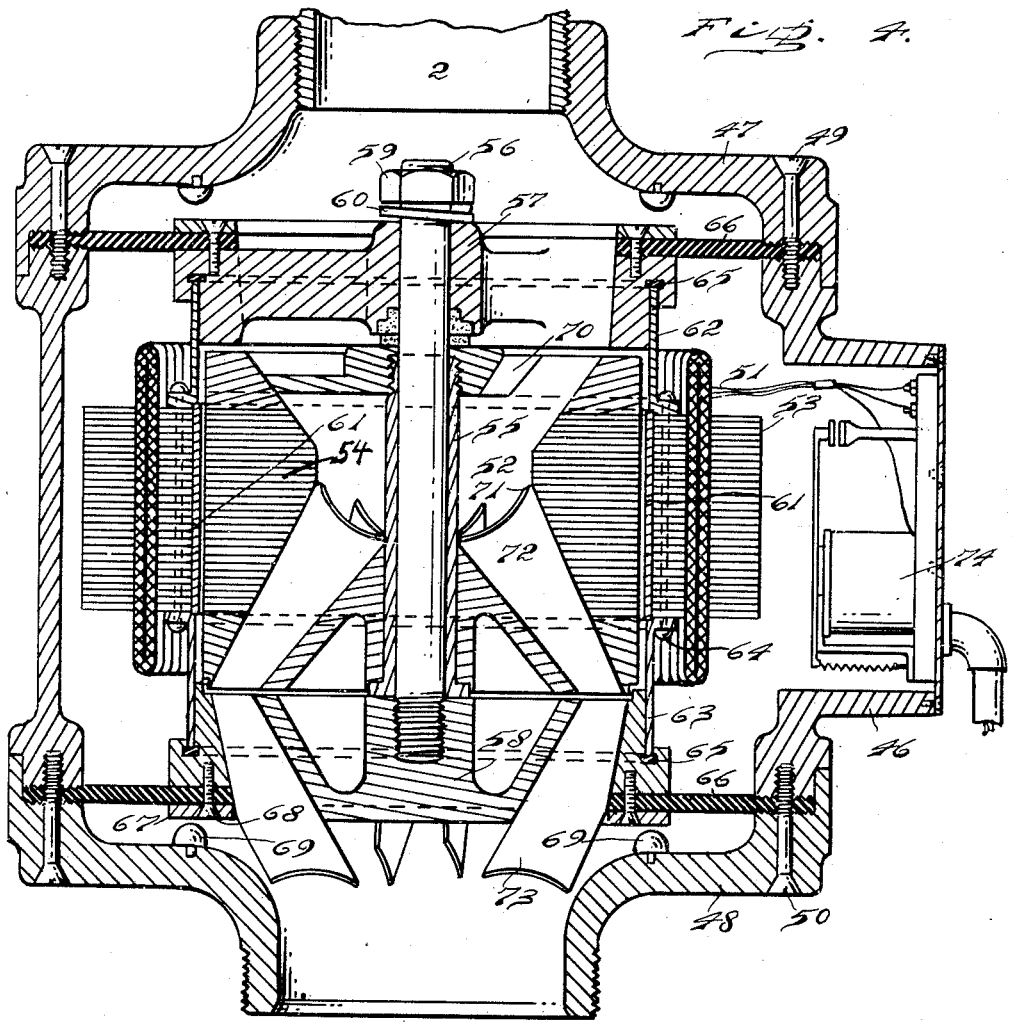
Figure 4 is a sectional elevation of the heat generator and circulator.
Figure 5:
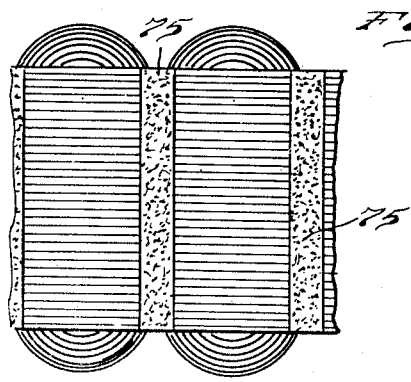
Figure 5 is a detail of a portion of a stator having its slots sealed with a plastic.

Referring to the drawings:

1 designates my novel heat generator and circulator, which is connected in a return line 2 having a valve 3, and a fitting 4. A pipe line 5 is coupled with the casing of the heat generator and circulator by a union 6 and has a valve 7. The valves 3 and 7 provide for the removal of the heat generator and circulator when desired. The pipe line 5 communicates with a tank or boiler 8, which is suitably insulated and which may have any desired contour in cross section but is preferably round for the sake of efficiency.

A riser 9 connected with the tank has a conventional flow valve 10. A by-pass 11 communicates with the far end of the tank near its bottom as at 12 and is provided with a control valve 13, the by-pass leading to the fitting 4 at the intake end of the heat generator and circulator.

The end 14 of the tank 8 has a passage 15 leading from an opening 16 to heating tubes 17 which communicate with a chamber 18 in a header 19. Heating tubes 20 lead from the chamber 18 to a passage 21 having a discharge opening 22 in proximity to the point at which the by-pass communicates with the tank.

A header contributes with the end 14 of the tank to form the passages 15 and 21, and is secured to the end of the tank by fastening devices 24. The heating tubes are enclosed by a casing 25 secured to the tank by fastening devices 26. A fluid inlet 27 communicates with the casing 25, leads from a source of fluid supply, and is provided with a controlling valve 28. The casing 25 has a drain 29 and a riser 30 leading to the faucets of the domestic fluid utilization.

The tank 8 is connected by a pipe 31 with an expansion tank 32. The tank 8 is provided with a conventional aquastat 33 and a gauge 34, which latter is a combination altitude, pressure and thermometer gauge.

The control valve 10 is of the weighted valve type, and, when the generator and circulator is operating, the force of the circulating fluid opens the valve. The valve 13 is a motorized valve, automatically controlled.

The wiring diagram

Referring now to Figure 3, 110 volt A. C. current passes from a source of supply by lines 35 and 40 to a fused switch 36. A hot line 37 leads to the heat generator and circulator 1 and a line 38 connects with a thermostat 45. A hot line 39 leads from switch 36 to the thermostat 45. Line 42 from line 39 connects with the aquastat 33 and line 41 with line 38. Line 43 leads from line 37 to the valve 13 which is connected by line 44 with the thermostat 45.

In the simplest form of the invention as shown in Figure 2, the return line 2 is connected with the intake end of the heat generator and circulator and the outlet therefrom with the riser 5. The motor can be automatically controlled in any desired manner.

*The heat generator and circulator*

In my prior Patents No. 2,285,050 and No. 2,312,848, I have described and broadly claimed a combined motor and pump which was designed for maximum electrical efficiency, and the present invention embodies many of the features of the patents aforesaid but has been redesigned and reconstructed to provide an electrical unbalance between the stator and rotor for the purposes herein set forth.

Referring now to Figure 4, 46 designates an outer casing to which end casing members 47 and 48 are secured by fastening devices 49 and 50, respectively. The end member 47 is threaded to receive the return line 2, and the discharge end member is adapted to receive the union 6 for the line 5, as will be understood from Figures 1 and 2. These end members and casing form a housing with a stator chamber 51 and a rotor chamber 52, in which a stator 53 and a rotor 54 are respectively mounted. The rotor is mounted on a sleeve bearing 55 on a shaft 56 mounted in end bearings 57 and 58. The rotor and end bearings are retained in assembled condition by the shaft 56, which at the outlet end is threaded into the end bearing 58, and, at the intake end, the shaft has a nut 59 and a spring washer 60 bearing against the end bearing 57.

Instead of having the stator and rotor separated from each other by a cylinder having high electrical resistance as in my prior patents aforesaid, they are separated from each other by a cylinder 61 which is non-magnetic but has high electrical conductivity.

End rings 62 and 63 fixed to the stacking or laminations of the stator by fastening devices 64 clamp tightly thereagainst, and are sealed with gaskets 65 when the rotor unit is assembled. These end rings 62 and 63 are non-magnetic and have high electrical resistance.

The end bearings 57 and 58 are resiliently supported by discs or rings 66, preferably of rubber or reinforced rubber secured to the end bearings by rings 67 and fastening devices 68, and to the housing and end members by the fastening devices 49 and 50.

The end housing members carry rubber bumpers 69 which may at times carry the weight of the rotor unit when the generator and circulator is installed in a vertical position, and which prevent metal to metal contact when installed in a horizontal position.

The rotor is tubular and its bore converges inwardly from each end towards its central portion. The intake end of the rotor has impeller blades 70 fixed to the sleeve bearing and an impeller 71 is mounted on the sleeve bearing and has helical blades 72 projecting outwardly from a cone shaped body portion of the impeller 71. The end bearing at the discharge end has spaced curved blades 73 which are straight at their discharge end to cause a straight line flow from the housing.

74 is a starting relay and overload cut-out.

The electrical unbalance between the stator and the rotor can be obtained in a number of different ways. For example, if the stator is built for a capacity of one quarter horse power to draw three hundred watts and the rotor built for a capacity of one tenth of a horse power to draw sixty watts, there will be the equivalent of two hundred and forty watts to heat the rotor.

Unbalance can be obtained by increasing the electrical air gap between the stator and rotor over that of conventional practice. This is preferably accomplished by making the cylinder of high conductivity of brass or other suitable conducting material.

Another manner of creating an electrical unbalance is to employ less magnetic steel in the stator winding assembly of short hour type, wound above the rated capacity and of lower voltage.

The operation will now be apparent to those skilled in this art and is as follows:

Since an electrical unbalance is created between the stator and rotor, the rotor will absorb heat and thereby heat the fluid being impelled.

The motor and the motorized valve 13 are controlled by the room thermostat. When the motorized valve 13 is open and the motor in operation, the pressure created in the boiler by its action is not sufficient to open the flow valve 10 in the riser 9, and there is therefore a constant circulation of the fluid through the heat generator and circulator and the boiler. This raises the temperature of the fluid in the boiler by heat induction as it passes through the heat generator and circulator.

When the boiler fluid reaches the predetermined temperature, the heat generator and circulator is automatically cut out by the aquastat 33. By this action, there is always a reservoir of heated fluid in the boiler ready to immediately satisfy the radiation requirements when a drop in room temperature demands heat.

The cycle of the operation is as follows:

1. The room temperature drops, causing the thermostatic circuit to close and thereby causing the heat generator and circulator to operate.

2. The valve 13 being in its closed position prevents by-passing of the fluid and the pressure in the boiler rises and causes the valve 10 to open.

3. The valve 10 remains open and the heated fluid is circulated through the radiating system.

4. This circulation continues until the room heat requirements are reached, which causes the thermostat to break the line circuit which in turn causes the valve 13 to open.

5. This action immediately relieves the boiler pressure and the flow valve 10 closes.

6. The heat generating unit continues to operate until a reservoir of heated fluid has accumulated, and then the aquastat stops the motor and the cycle is repeated when necessary.

The domestic or an auxiliary supply of heated fluid is obtained by the copper tubes 17 and 20 extended into a partitioned portion of the boiler in which there is a constant supply of fresh fluid, which is heated by the hot fluid forced through the tubes.

The economy of the system when used for house heating will be apparent from the following.

Special rates for electric current consumed for heating purposes, in Philadelphia, Pa., 9 mills per k. w. h. or $\frac{9}{10}$ cent per k. w. h.

Formula 1000 watt hour equals 1 k. w. h. equals nine tenths cent equals 40 gallons water 100° rise.

10 k. w. h. equals nine cents equals 400 gallons of water 100° rise.

20 k. w. h. equals eighteen cents equals 800 gallons of water 100° rise.

30 k. w. h. equals twenty-seven cents equals 1200 gallons of water 100° rise.

This represents 1200 gallons of water in twelve hours of operation at 100° rise in temperature.

The differential temperature in a boiler is usually set at 60° to 70° drop in temperature.

In some case arising in practice where less heating of the circulating fluid is desired, the cylinder of high electrical conductivity 61 may be omitted and the slots of the stator stacking or laminations filled with a plastic 75, which is substantially fluid and heat proof and resistant to the chemical action of the fluid circulated. Except for this removal of the cylinder and arranging for the proper air gap to give the heating effect, the construction would be the same as that shown in Figure 4.

By varying the thickness of the cylinder, the heating can be varied. Increase of the air gap increases the heating effect.

Having thus described my invention, what I claim as new and desire to secure by Letters Patent is:

1. In a heat generator and circulator, a casing having an inlet and an outlet, a tubular rotor within the casing having an impeller, a stator surrounding the rotor, and a non-magnetic cylinder having high electrical conductivity between the stator and rotor to create an electrical unbalance between the stator and rotor throughout the length of the rotor, whereby the rotor is heated to heat the fluid being impelled by the impeller.

2. In a heat generator and circulator, a casing having an inlet and an outlet, a tubular rotor within the casing and having an impeller, a stator surrounding the rotor and resiliently suspended in the casing, and a non-magnetic cylinder having high conductive capacity between the stator and rotor and extending the length of the rotor, whereby electrical unbalance is created between the stator and rotor to effect heating of the rotor and thereby of the fluid being impelled therethrough.

3. The construction specified in claim 1, wherein the cylinder contributes to isolate the stator windings from the fluid being impelled.

4. In a heat generator and circulator, a casing having an inlet and an outlet, a tubular rotor in the casing having an impeller, end bearings for the rotor, a stator surrounding the rotor, sealed with the end bearings and carried by the casing, and a non-magnetic cylinder having high electrical conductivity between the stator and rotor and extending the length of the rotor to effect heating of the rotor and thereby of the impelled fluid.

5. In a heat generator and circulator, a casing having an inlet and an outlet, a tubular rotor in the casing having an impeller, a stator surrounding the rotor, non-magnetic end cylinders having high electrical resistance fixed to the stator, end bearings for the rotor and sealed with said end cylinders and supported from the casing, and a non-magnetic cylinder having high electrical conductivity between the stator and rotor and extending throughout the length of the rotor to effect heating of the rotor and thereby of the impelled fluid.

6. The construction set forth in claim 5, wherein the end cylinders abut against the cylinder of high electrical conductivity.

7. In a heating system, a casing having its intake connected with the return from the system and its outlet connected with the intake of the system, a tubular rotor in the casing having an impeller, a stator in the casing surrounding the rotor, end rings having high electrical resistance contributing to support the stator, and a non-magnetic cylinder, having high electrical conductivity, between the stator and rotor to create an electrical unbalance and the heating of the rotor and thereby of the impelled fluid.

ALBERT R. PEZZILLO.

REFERENCES CITED

The following references are of record in the file of this patent:

UNITED STATES PATENTS

| Number | Name | Date |
|---|---|---|
| 2,154,764 | Moray | Apr. 18, 1939 |
| 2,167,695 | Stewart | Aug. 1, 1939 |
| 2,175,912 | Petrich | Oct. 10, 1939 |
| 2,255,967 | Collins | Sept. 16, 1941 |
| 2,319,730 | Garraway | May 18, 1943 |
| 2,312,848 | Pezzillo | Mar. 2, 1943 |
| 2,318,786 | Korte et al. | May 11, 1943 |
| 2,319,934 | Korte et al. | May 25, 1943 |
| 2,352,958 | Lauer et al. | July 4, 1944 |